US012571702B1

(12) United States Patent
Milgram

(10) Patent No.: US 12,571,702 B1
(45) Date of Patent: Mar. 10, 2026

(54) APPARATUS AND METHOD FOR AERODYNAMIC TESTING OF MOVING SHIPS

(71) Applicant: United States of America as Represented by the Secretary of the Navy, Arlington, VA (US)

(72) Inventor: Judah H. Milgram, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 284 days.

(21) Appl. No.: 18/542,039

(22) Filed: Dec. 15, 2023

Related U.S. Application Data

(60) Provisional application No. 63/387,576, filed on Dec. 15, 2022.

(51) Int. Cl.
*G01M 9/08* (2006.01)
*G01M 9/02* (2006.01)

(52) U.S. Cl.
CPC ................ *G01M 9/08* (2013.01); *G01M 9/02* (2013.01)

(58) Field of Classification Search
CPC .................................. G01M 9/08; G01M 9/02
USPC ........................................................... 73/147
See application file for complete search history.

(56) References Cited

U.S. PATENT DOCUMENTS 3,052,120 A * 9/1962 Goodman ............... B63B 71/20
73/147
3,362,368 A 1/1968 Ringleb 5,343,742 A * 9/1994 Cusanelli ................ B63B 71/20
73/170.15
8,657,053 B2 2/2014 Novikov-Kopp
10,414,464 B2 9/2019 Moen
2019/0368461 A1* 12/2019 Korde ................... F03B 13/148
2021/0239564 A1* 8/2021 Ma ............................ G01P 5/00
(Continued)

FOREIGN PATENT DOCUMENTS

CN 205533303 U * 8/2016
CN 106644353 A * 5/2017 .............. G01M 9/02
CN 109974963 A * 7/2019 .............. G01M 9/08
(Continued)

OTHER PUBLICATIONS

Translation_CN106644353 (Year: 2020).*
(Continued)

*Primary Examiner* — Peter J Macchiarolo
*Assistant Examiner* — Monica S Young
(74) *Attorney, Agent, or Firm* — Jesus J. Hernandez; U.S. Department of the Navy, Office of the General Counsel

(57) ABSTRACT

Example embodiments provide a modeling apparatus comprising a model ship configured for use in a wind tunnel, the model ship comprising a hull and a superstructure, a water surface plane representing a water surface in which the model ship operates, and a resonance control mechanism comprising a support structure, a pitch actuation mechanism, and a pitch control mechanism. The support structure is connected to the model ship and provides a pitch axis about a joint traversing the model ship. The pitch control mechanism tunes the natural frequency of the model ship to a desired value. The pitch actuation mechanism imparts oscillatory pitching motions to the model ship.

12 Claims, 6 Drawing Sheets

(56)     References Cited

U.S. PATENT DOCUMENTS

2022/0363379 A1* 11/2022 MacDougall ........... B64D 1/22

FOREIGN PATENT DOCUMENTS

| EP | 3825651 A1 | 5/2021 | |
| RU | 2365520 C2 * | 8/2009 | |
| RU | 2688964 C1 * | 5/2019 | G01M 1/16 |

OTHER PUBLICATIONS

Anish J. Sydney, Joseph P. Ramsey, Joseph I. Milluzzo, "Time—Resolved PIV Measurements of Ship Motion and Orientation Effects on Airwake Development," AIAA Aviation Forum, 35th AIAA Applied Aerodynamics Conference, Denver, Colorado (Jun. 5-9, 2017).

Islam, H.; Sutulo, S.; Guedes Soares, C. Aerodynamic Load Prediction on a Patrol Vessel Using Computational Fluid Dynamics. J. Mar. Sci. Eng. 2022, 10, 935. https://doi.org/10.3390/jmse10070935.

Penghui Wang; Fei Wang; Zuogang Chen; Yi Dai, "Aerodynamic optimization of a luxury cruise ship based on a many-objective optimizationsystem," Ocean Engineering, vol. 236, Sep. 15, 2021, 109438.

* cited by examiner

100

APPARATUS AND METHOD FOR AERODYNAMIC TESTING OF MOVING SHIPS

CROSS-REFERENCE TO RELATED APPLICATIONS

This application claims the benefit of U.S. Provisional Application No. 63/387,576 filed Dec. 15, 2022, titled "Apparatus and Method for Aerodynamic Testing of Moving Ships," incorporated herein by reference.

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to ship modeling.

BACKGROUND

Developing computational models of ship superstructure aerodynamics is challenging. The presence of multiscale bluff-body features, atmospheric boundary layers and turbulence, and motion of the ship itself are some of the challenges associated with such modeling.

Currently, all ship airwake computational fluid dynamic (CFD) models rely on high-quality experimental data for validation. Some detailed data are available for static ships at fixed pitch, heel, and yaw angles. However, experimental data for moving vessels are lacking.

The competing requirements of sufficiently high Reynolds number and full scale reduced frequency make subscale wind tunnel tests of moving ships especially difficult. Experimental models must incorporate realistic penetration of the water surface plane. There are mechanical challenges involved in producing sufficiently high frequency ship motion while maintaining low vibration and a low-friction seal between the hull and the water surface plane. Moreover, well-defined hull and sea-surface shapes are required in order to facilitate computational meshing and allow for meaningful CFD validation exercises.

SUMMARY

Example embodiments provide a modeling apparatus comprising a model ship configured for use in a wind tunnel, the model ship comprising a hull and a superstructure, a water surface plane representing a water surface in which the model ship operates, and a resonance control mechanism comprising a support structure, a pitch actuation mechanism, and a pitch control mechanism. The support structure is connected to the model ship and provides a pitch axis about a joint traversing the model ship. The pitch control mechanism tunes the natural frequency of the model ship to a desired value. The pitch actuation mechanism imparts oscillatory pitching motions to the model ship.

BRIEF DESCRIPTION OF DRAWINGS

The accompanying figures are included to provide a further understanding of example embodiments, and are incorporated in and constitute part of this specification. In the figures.

DETAILED DESCRIPTION

Figure 1:
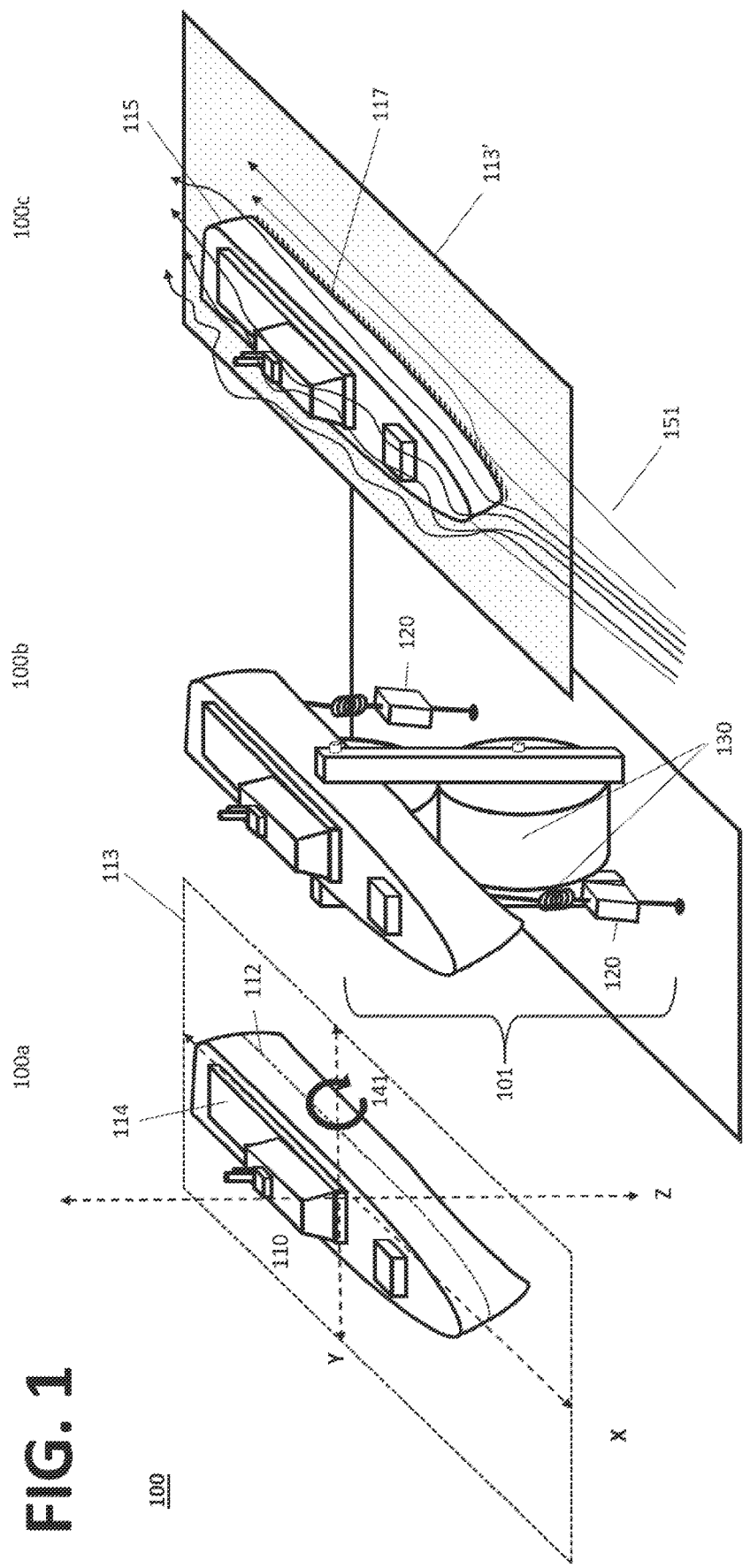
FIG. 1 depicts different operational perspectives of a scale model ship apparatus for aerodynamic testing, according to example embodiments.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to an apparatus and method for aerodynamic testing of moving ships. However, it should be noted that the example embodiments shown and described herein are meant to be illustrative only and not limiting in any way. As such, various modifications will be apparent to those skilled in the art for application to other fields based on technologies other than the below, which may be in various stages of development and intended for future replacement of, or use with, the above described method or apparatus.

The goal of example embodiments is to provide an apparatus for producing high-quality experimental wind tunnel measurements of a ship undergoing oscillatory pitching motion. The apparatus may allow for testing at full-scale reduced frequencies and meaningful Reynolds numbers. A model used in example embodiments may not need to represent an actual hull and/or topside with granular accuracy. Rather, a model ship according to example embodiments may incorporate a baseline amount of sufficiently realistic features to allow for straightforward geometric definition and validation of Computational Fluid Dynamics (CFD) and other analytical models.

Example embodiments are intended to allow for the generation of high-quality experimental data for a canonical ship hull and topside undergoing oscillatory pitching motion. In some alternative example embodiments, experimental data associated with a rolling motion may also be generated. These data may be used to validate CFD methods, guide the development of advanced methods, and provide new physical understanding.

There are mechanical challenges involved in producing sufficiently high frequency ship motion while maintaining low vibration and a low-friction seal between the hull and the ground plane. To illustrate, ω may be a frequency (Hz) and T may be a period of motion of a ship pitching in a seaway. L may be a characteristic length, for example the length of the ship. V may be the wind over deck (WOD) velocity. As such, a reduced frequency κ may be defined as follows:

$$\kappa = \frac{\omega}{(V/L)} = \frac{(1/T)}{(V/L)}$$

In this expression, the numerator 1/T represents the physical frequency of motion in Hz and the denominator V/L is a characteristic frequency of the airflow equal to the airflow velocity expressed in characteristic lengths per second. The reduced frequency κ therefore is a nondimensional parameter indicating the physical frequency of motion relative to the characteristic frequency of the flow.

In view of this property, a full-scale ship 400 ft in length with 30 kt wind over deck and a 20 second pitch period would have a Reynolds number of $129 \cdot 10^6$ and a reduced frequency κ=0.40. At typical model scale, at a tunnel speed of 100 kt and a model length of 4 ft, the Reynolds number would come to approximately $4.3 \cdot 10^6$, which is arguably high enough for meaningful results. However, to achieve a full scale reduced frequency, the physical frequency of the model would need to be $(V/L) \cdot \kappa = 16.7$ Hz, which, for a four-foot model, presents challenges in mechanical design of the mechanism and gap seals.

The physical frequency required to match the full-scale reduced frequency may be reduced by reducing tunnel speed. However, this may also reduce the model Reynolds number. Therefore, a preferred way to approach the scaling problem is through an effective model pitch mechanism that allows for high-frequency model motion.

Some laboratories have been known to use a wind tunnel test model with "vertical" ship hulls (prismatic hulls with sides perpendicular to the waterline) to allow pitch and heave motion through the water surface plane while maintaining a good seal. Other researchers have used more typically curved hulls, requiring a relatively large gap between the hull and the water surface plane that must be sealed with wide, flexible seals to prevent airflow through the gap. Example embodiments provide improvements on these approaches.

A ship's waterplane is the region defined by the intersection of its hull with the water surface plane. If a pitch motion (and/or possibly a roll motion) is to be accommodated by a model, conventional hull shapes do not provide an absolutely constant waterplane shape. According to example embodiments, the waterplane remains constant during pitching motion to allow use of a high-precision minimal air gap between the hull and the edge of the waterplane cutout. This may be done without any mechanical sealing mechanism at all. Example embodiments also provide an approach to driving the model at realistic reduced frequencies while minimizing vibrational loads imparted on the wind tunnel floor.

FIG. 1 depicts different operational perspectives 100 of a scale model ship apparatus for aerodynamic testing, according to example embodiments. The three operational perspectives are an axial perspective 100a, a mechanical perspective 100b, and an aerodynamic testing perspective 100c. A model ship 110 is depicted in each of the three perspectives. Each perspective has a unique point of focus pertaining to operation of the model ship 110 according to example embodiments.

The axial perspective 100a of a scale model ship apparatus depicts the model ship 110 with a three dimensional coordinate axis system (X, Y, Z). The model ship pitch axis 141 may be along the Y-axis. Traversing the model ship 110 hull is a fixed water surface plane 113. In the axial perspective 100a, the water surface plane 113 is an imaginary plane (whereas the water surface plane 113 is a physical plane in the aerodynamic testing perspective 100c). The intersection of the water surface plane 113 with the hull of the model ship 110 may define a waterline 112. The region lying in the water surface plane 113 and bounded by the waterline 112 may be the model ship's waterplane.

In conventional hull forms, a model ship's waterplane will change in shape with a positive or negative pitch by the model ship. A goal of example embodiments is to provide a hull form in model ship 110 whose waterplane 113 remains fixed during pitching motion.

The mechanical perspective 100b depicts the physical structure of the model ship 110 and an associated resonance control mechanism 101. The resonance control mechanism 101 includes a pitch control mechanism 130 and a pitch actuation mechanism 120.

The resonance control mechanism 101 provides support arms for carrying joints, which in turn support the model ship 110 while allowing pitch movement. The top joint is co-located with the pitch axis 141 of the axial perspective 100a.

In the resonance control mechanism 101, the pitch control mechanism 130 may include two flywheels and two springs. The pitch actuation mechanism 120 may include an actuator at each side. The pitch actuation mechanism 120 may impose oscillatory pitching motion of the model ship 110 about its pitch axis 141. Beneath the resonance control mechanism 101 may be a wind tunnel floor that reacts to the loads transmitted directly by the springs and pitch actuation mechanisms 120, and indirectly via the support arms by the flywheels. The resonance control mechanism 101 may reduce the required pitch actuation forces and minimize total vibratory loads reacted into the wind tunnel floor. Each mechanism is discussed in further detail in FIG. 2.

The pitch control mechanism 130 of the resonance control mechanism 101 may include a flywheel fixedly connected to the model ship 110 and a counter-rotating flywheel just below it. The counter-rotating flywheel may act as a counter-rotating dynamic balancing mass. It may be fitted to the model ship 110 to minimize or eliminate the total vibrational reaction load transmitted to the wind tunnel floor. When the model ship is operated at resonance, the reaction loads may be limited to those associated with aerodynamic loads, gap seal friction, and frictional loads in the pitch mechanism itself.

The model ship 110 may be constructed using lightweight construction techniques. In particular, a superstructure 114 may be a carbon fiber/foam sandwich (per aerospace practice), or a thin-walled additive manufactured article reinforced with bulkheads and stringers. In alternative embodiments, the entire model ship 110 may be constructed using these same techniques. By using lightweight construction techniques, the pitching moment of inertia of both the model ship 110 and the flywheels of the pitch control mechanism 130 can be reduced to a minimum. This may also minimize the required stiffness of the pitch springs in the pitch control mechanism 130 for a given natural frequency. The pitch control mechanism 130 may include the springs at the bow and stern of the model ship 110. The model ship 110 may be actuated in pitch via the pitch actuation mechanism 120. The actuators of the pitch actuation mechanism 120 may be located symmetrically about the pitch axis towards the bow and the stern of the model ship 110. The actuators may be integrated with the springs of the pitch control mechanism 130. Alternatively, the actuators may be mounted separately between the wind tunnel floor 1 and the ship model 110.

The aerodynamic testing perspective 100c depicts the model ship 110 in a testing environment. The model ship 110 may be in a wind tunnel. Traversing the model ship 110 is a controlled airflow 151. Under this test scenario, the ship is surrounded by a physical water surface plane 113' that models the water surface. Only the freeboard 115 of the hull of the model ship 110 is visible. The resonance control mechanism 101 resides below the physical water surface plane 113', thereby not impacting the airflow 151 in the wind tunnel.

The freeboard 115 is defined by a water line created by the intersection of the physical water surface plane 113' and the hull of model ship 110. The water surface plane 113' features a waterplane cutout 117 bounded by the water line 112 through which the model ship hull 110 extends. A very minimal gap may exist between the boundary of the waterplane cutout 117 and the hull of the model ship 110.

The hull of the model ship 110 may be a body of revolution about its pitch axis. As the model ship 110 pitches, the waterplane remains constant in size and shape. This may allow for a very close fitting waterplane cutout 117 having little or no mechanical contact with the hull. By careful construction and fitting, a very thin gap may result, providing low air mass movement through the gap and near-zero friction.

The natural frequency in pitch of the model ship 110 may be tuned to a desired physical frequency corresponding to a full-scale reduced frequency. This may allow the model ship 110 to be driven in resonance. Driving the model ship 110 in resonance reduces actuation power and load requirements.

Figure 2:
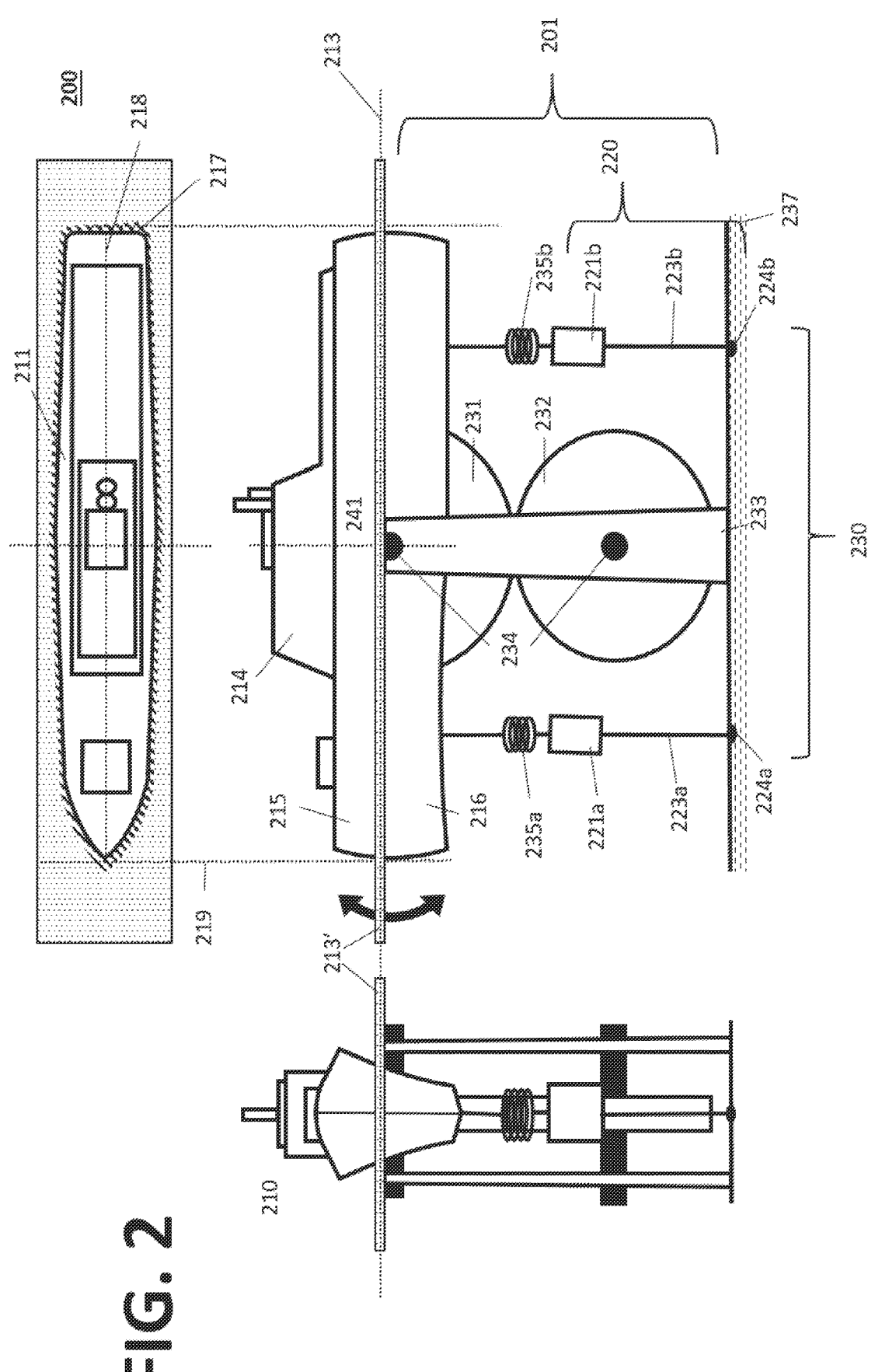
FIG. 2 is a scale model ship apparatus for aerodynamic testing, according to example embodiments.

FIG. 2 is a scale model ship apparatus 200 for aerodynamic testing, according to example embodiments. The scale model ship apparatus 200 is depicted from three different points of view to better illustrate its configuration. These are a side view (port side), a front view, and a top view.

The scale model ship apparatus 200 includes a model ship 210 that is supported by a model ship support structure 201. The model ship 210 may include a superstructure 214 and a hull 211. The hull 211 of the model ship 210 may be mounted within a waterplane cutout within a physical water surface plane 213'. The physical water surface plane 213' aligns with a constant water plane 113. Above the physical water surface plane 213' is a model ship freeboard 215, and below the physical water surface plane 213' is a model ship draught 216. As illustrated in the top view, traversing the model ship 210 may be a centerline 218.

The resonance control mechanism 201 may include pitch control mechanism 230. The pitch control mechanism 230 may include springs 235a and 235b and flywheels 231 and 232. The flywheel 231 is connected directly to the model ship 210 and its mass distribution is tuned so that the center of mass of the combined ship model 210 and flywheel 231 lies on the model ship pitch axis.

Below the flywheel 231 may be a counterrotating flywheel 232, having the same diameter as flywheel 231 and same moment of inertia in pitch as the combination of flywheel 231 and model ship 210. The flywheel 232 is balanced around its axis of rotation and engages flywheel 231 via gear teeth, contact friction or other means, so that the two flywheels are constrained to rotate in opposite directions with identical speed and acceleration. With the model ship 210 pitching freely at its natural frequency, the counterrotating flywheels will impart a pitching moment reaction into the wind tunnel floor through the support arm 233 that counteracts the pitching moment reaction imparted through the springs 235a and 235b. Thus, when the system is operated at its natural frequency, the total vibratory loads reacted into the wind tunnel floor 237 will be due only to the actuator loads, which in turn need only overcome the relatively small pitching moments due to aerodynamic loads, gap seal friction and friction within the mechanism itself. The large actuation loads which would be required to pitch only the ship model are avoided, and the total loads reacted into the wind tunnel floor 237 will be correspondingly small. In this manner, actuation requirements and vibration of the wind-tunnel floor structure may be minimized.

Maintaining both the flywheel 231 and the counterrotating flywheel 232 in place is a flywheel support 233. Joints 234 may extend from the centers of the flywheel 231 and the counter rotating flywheel 232 to the flywheel support 233, thereby providing an axis of rotation. Notably, the top joint 234 connected to the flywheel 231 also acts as the model ship pitch axis 241. The top joint 232 may be located midway along the hull 211.

The resonance control mechanism 201 may include a pitch actuation mechanism 220. The pitch actuation mechanism 220 may include actuators 221a and 221b at the bow and the stern of the model ship 210. At the bow, a bow actuator line 223a may connect the bow of the model ship 210 to a bow actuator line base 224a. The bow actuator line 223a may integrate a bow actuator 221a and the bow pitch spring 235a. Likewise, a stern actuator line 223b may connect the stern of the model ship 210 to a stern actuator line base 224b. The stern actuator line 223b may integrate a stern actuator 221b and a stern pitch spring 235b. The bow actuator 221a and the stern actuator 221b may be identical and driven 180° out of phase with one another.

The model ship 210 may be ideally be driven in resonance. A dynamic design of the resonance control mechanism 220 may have the bow pitch spring 222a and stern pitch spring 222b tuned to place the rigid body pitch mode of the model ship 210 combined with flywheels 231 and 232 at the frequency corresponding to the full-scale reduced frequency.

The model ship 210 may be constructed with advanced materials to ensure that it is stiff and light. The model ship 210 may be constructed to have a correspondingly low pitch moment of inertia, allowing for the softest possible pitch springs 222a, 222b and lightest counter-rotating flywheel 232.

The design of the model ship 210 helps minimize total vibration transmitted through the model ship support structure 201, while at the same time reducing the possibility of undesired contact between the hull 211 of the model ship 210 and a waterplane cutout. The model ship superstructure 214 may be a canonical geometric shape, such as, for example, the Simple Frigate Shape 2 (SFS-2). In alternative embodiments, the superstructure 214 may be the superstructure of an actual or planned vessel. Instrumentation of the model ship apparatus 200 may include surface pressure taps, load cells, Particle Image Velocimetry (PIV), or some combination of these.

In one example embodiment, the scale model ship apparatus 200 may have a length L of 4 ft and a mass M of 3 slugs, corresponding to a weight of approximately 100 Ib. As previously mentioned, the model ship pitch axis 241 may be midway along the hull 211. The mass may be distributed uniformly over the model length with the center of mass at the pitch axis, allowing the pitching moment of inertia to be calculated as:

$$I_\theta = \frac{ML^2}{12} = 4 \text{ slug ft}^2$$

In this example, assuming the ship model and counter-rotating flywheel have matching moments of inertia $I_\theta=4$ slug ft$^2$, and the pitch springs 222a and 222b are mounted at the bow and stern of the ship model, the natural frequency in pitch of the system will be:

$$\omega_n = \sqrt{\frac{kL^2}{I_\theta}} \text{ 1/s}$$

Tuning to a prescribed natural frequency then requires springs with spring constant $$k = \omega_n^2 \cdot \frac{I_\theta}{L^2}$$

so that tuning the natural frequency to 16.7 Hz requires springs with spring constant $$(2\pi \cdot 16.7)^2 \cdot \frac{4}{4^2} = 2,752 \text{ lb/ft}$$

This equation illustrates the value of using lightweight construction techniques. The resulting spring value in this example embodiment is sizeable but not unrealistic. Once the model ship 210 is tuned to the desired frequency, it may be driven easily in resonance with relatively low power using a variety of actuation methods such as electromagnets or other mechanical or hydraulic actuators.

The model ship 210 may be actuated using two matched actuators, positioned symmetrically forward and aft of the pitch axis, and driven by a common controller that ensures that each bears half the actuation load. The example embodiment in FIG. 2 depicts a bow actuator 221a and a stern actuator 221b.

This produces a couple about the pitch axis of the model. Since the model ship 210 is driven in resonance, the only actuation loads required are those associated with friction and aerodynamics of the model ship 210. If the gap between the hull 211 and the edge of the waterplane cutout 217 is thin enough, a mechanical seal in contact with the hull 211 may become unnecessary. This may eliminate one source of friction. Aerodynamic loads will need to be estimated in order to size the actuators 221a, 221b.

In alternative example embodiments, the model ship apparatus 200 may be configured to model a roll motion by defining the shape of hull 211 as a body of revolution about the ship roll axis. The moment of inertia about the roll axis may be much less than that about the pitch axis, simplifying a drive mechanism. The drive mechanism may be actuated using an electromagnetic voice coil or commercial off-the shelf (COTS) actuators and drive electronics. The sizing and kinematics of the actuators 221a, 221b may be optimized to minimize vibratory loads transmitted through the model ship support structure 201.

The pitch springs 235a, 235b may be used to tune the model ship 210 to a range of varying conditions, such as: (i) a constant reduced frequency while varying the tunnel speed; and/or (ii) a constant tunnel speed while varying reduced frequency. In alternative example embodiments, the pitch control mechanism 220 may use tuning weights as an alternative to varying the spring tuning.

Figure 3:
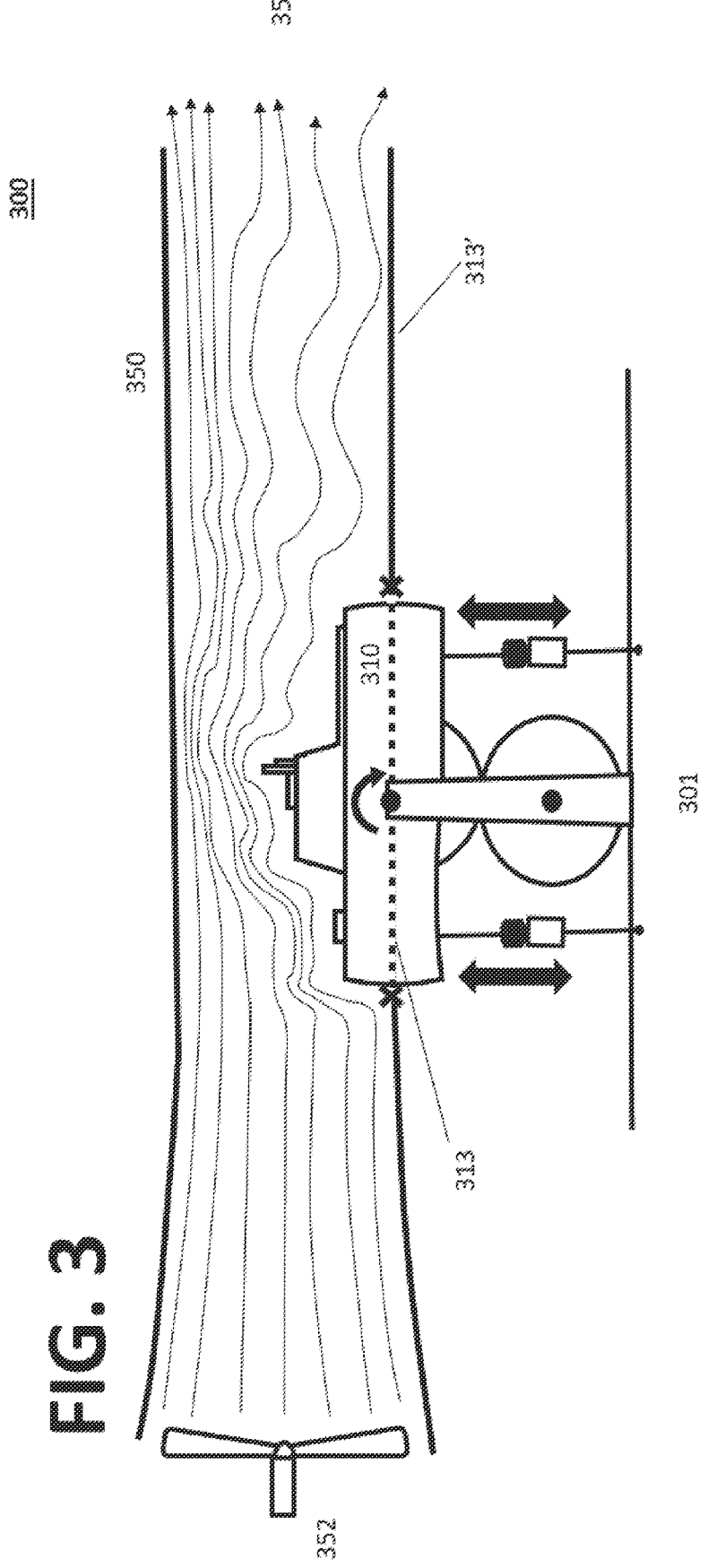
FIG. 3 is a wind tunnel cross section of a scale model ship apparatus for aerodynamic testing, according to example embodiments.

FIG. 3 is a wind tunnel cross section 300 of a scale model ship apparatus for aerodynamic testing, according to example embodiments. A model ship 310 may be connected to a resonance control mechanism 301, as previously described. The model ship itself may reside within a wind tunnel 350. In this example embodiment, the floor of the wind tunnel 350 may act as a water surface plane 313, and by extension the physical water plane 313'. The wind tunnel 350 may have at one end a fan 352. The fan 352 may generate a controlled airflow 351, which traverses the model ship 310.

By configuring the model ship 310 with a physical water surface plane 313', the model ship 310 may pitch with a constant gap between the hull of the model ship 210 and the edge of a physical waterplane cutout. This configuration allows for the components of the model ship apparatus to be built with enough precision to maintain an extremely thin gap. This may obviate the need for mechanical seals. In some example embodiments, a flexible seal of a simplified design may be used, given the constant and minimal gap thickness created between the hull of the model ship 210 and the edge of the waterplane cutout in the physical water surface plane 313'. In some example embodiments, the hull of the model ship 210 may be precision-fit to the water surface plane through careful lapping of the hull to ensure a perfect body of revolution matching the waterplane cutout. In alternative example embodiments, a gap seal vacuum/blowing system may be employed to reduce mass flow through the gap to an absolute minimum without the use of mechanical seals.

Figure 4:
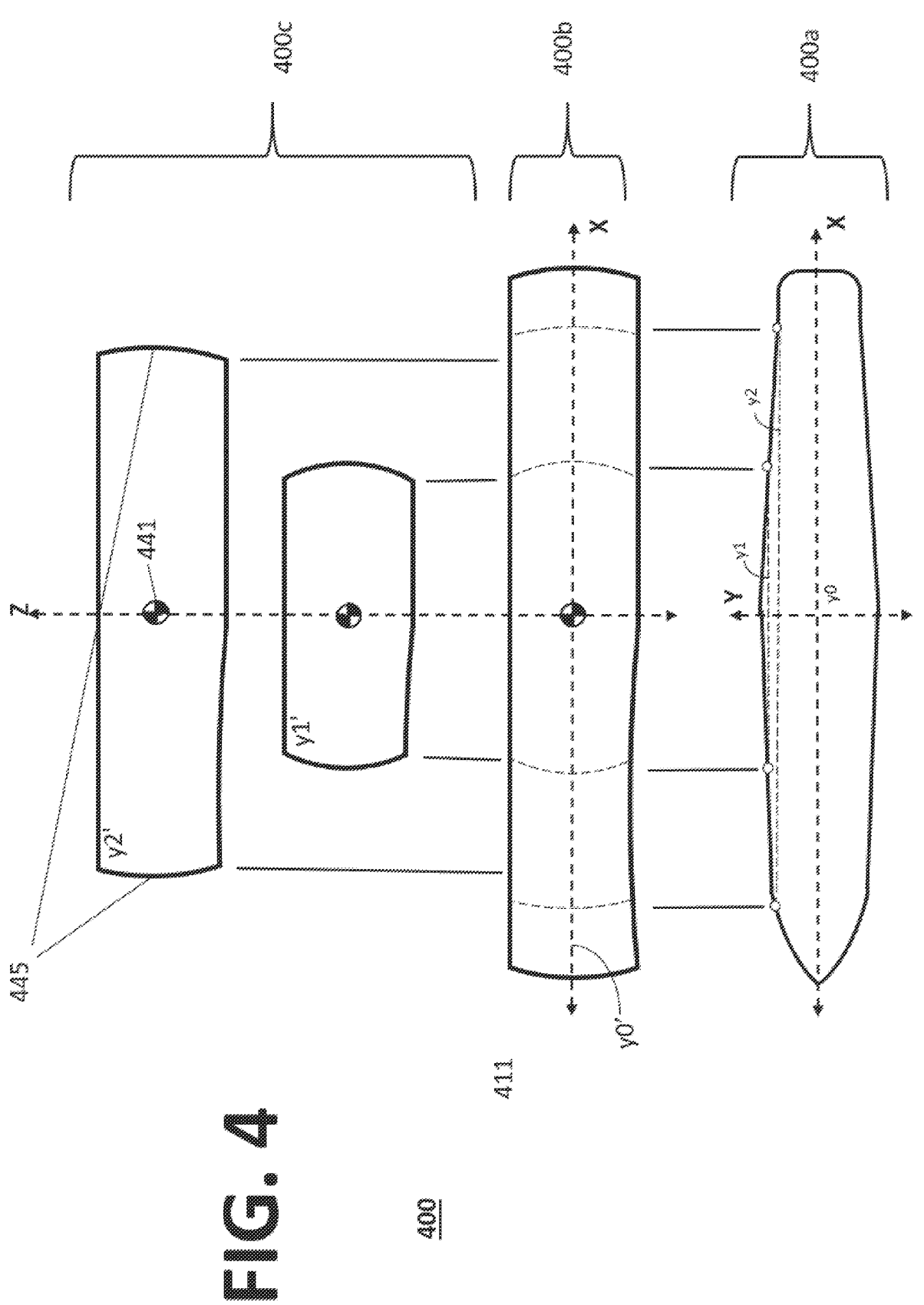
FIG. 4 depicts horizontal sectional views of a hull of a model ship apparatus for aerodynamic testing, according to example embodiments.

FIG. 4 depicts horizontal sectional views 400 of a hull of a model ship apparatus for aerodynamic testing, according to example embodiments. Three views are depicted: a waterplane view 400a, a portside view 400b, and a horizontal sections view 400c. All views are with reference to a model ship hull 411 according to example embodiments.

In the waterplane view 400a, the model ship hull 411 has a centerline y0 collocated with its longitudinal axis. The model ship hull 411 also has a first buttline y1 and a second buttline y2, both traversing the starboard side. The buttlines translate to segments of the model ship hull, better defined in portside view 400b.

Portside view 400b depicts the model ship hull 411. The pitch axis 441 of the model ship hull 411 may be midway along the hull. As can be seen, each buttline defines a hull segment, illustrated in view 400c. The forward and aft edges of the segments are arcs of constant radius. For example, the centerline y0 corresponds to a hull segment defined by arcs of radius equal to half the hull length y0'. As such, as the model ship hull 411 rotates about the pitch axis, the distance from the midpoint to the bow or stern of the model ship hull 411 remains the same. Likewise, the same holds true for any particular segment, such as cross section y1' and cross section y2', corresponding with the first buttline y1 and the second buttline y2, respectively. In practice, the model ship hull can be constructed by bonding a series of such hull segments together and smoothing the steps between adjacent segments with a sandable filler.

This hull configuration allows the model ship apparatus to maintain a constant and minimal gap thickness between the model ship hull 411 and the waterplane cutout. This reduces the need to use mechanical seals. The combination of a body of revolution with an absolutely flat water surface plane defines a geometry with a relatively simple mathematical description. This may aid researchers who intend to model the test setup analytically with CFD or other methods.

Figure 5:
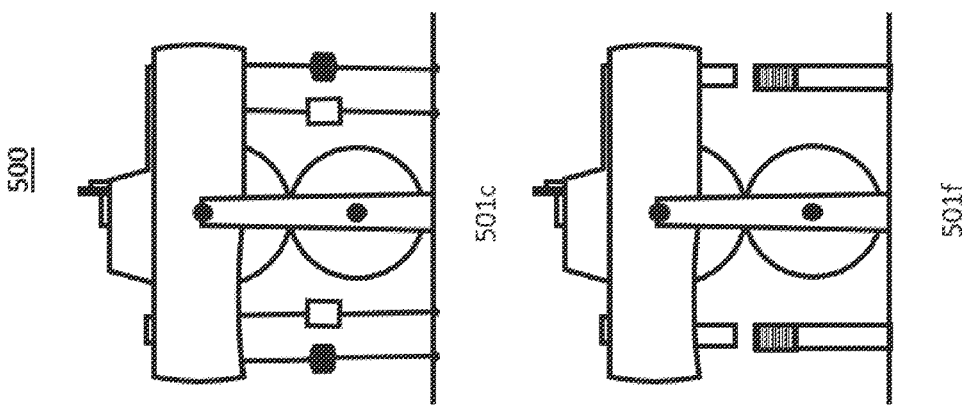
FIG. 5 depicts model ship support structures of a scale model ship apparatus for aerodynamic testing, according to example embodiments.
Figure 5:
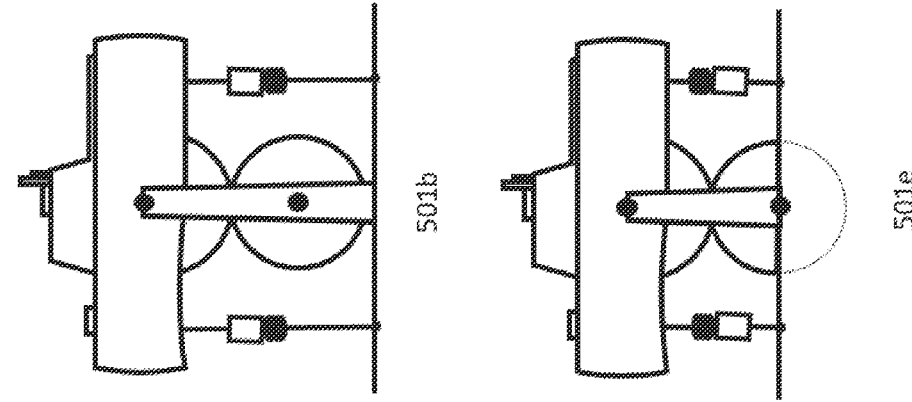
Figure 5:
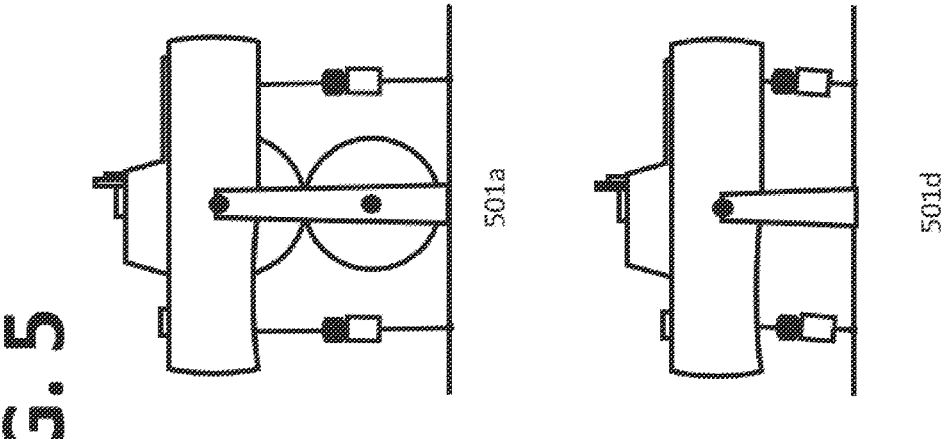

FIG. 5 depicts model ship support structure 500 of a scale model ship apparatus for aerodynamic testing, according to example embodiments. In a first example embodiment, a first model ship resonance control mechanism 501a reflects the configuration previously discussed.

In a second example embodiment, a second resonance control mechanism 501b includes the same arrangement as the first model ship, but the springs and the actuators are reversed along the actuator lines. While this example is possible, it is less ideal.

A third resonance control mechanism 501c has the springs and actuators in separate support lines at the bow and stern of the model ship. This approach provides improved resonance control and measurement characteristics.

A fourth resonance control mechanism 501d removes the flywheel and counterrotating flywheel of the pitch control mechanism are removed. This example embodiment may be adequate for lighter models operating at lower physical frequencies, where vibration would not be expected to be a problem.

In a fifth example embodiment, a fifth resonance control mechanism 501e maintains both a pitch actuation mechanism and a pitch control mechanism. However, the flywheel support is shorter, such that a portion of the counter rotating flywheel is below the surface of a wind tunnel floor supporting the entire fifth resonance control mechanism 501e.

In a sixth example embodiment, a sixth resonance control mechanism 501f replaces the actuators and actuator lines with electromagnetic actuators.

Figure 6:
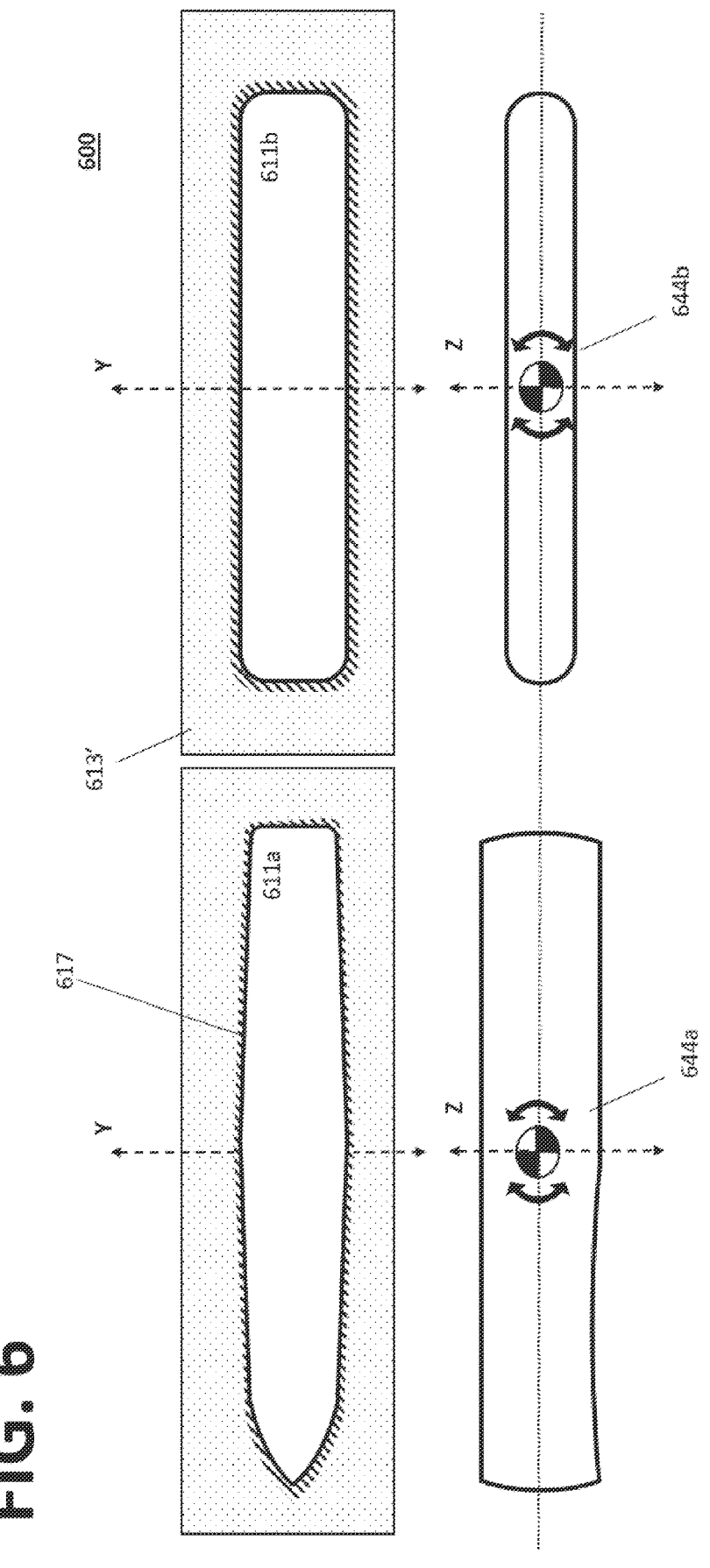
FIG. 6 depicts hull configurations of a scale model ship apparatus for aerodynamic testing, according to example embodiments.

FIG. 6 depicts hull configurations 600 of a scale model ship apparatus for aerodynamic testing, according to example embodiments. The hull configurations 600 depicted include a frigate hull of a model ship 611a and barge hull of a model ship 611b. A top view of each hull configuration shows the physical water surface plane 613' and the waterplane cutout 617 within which each hull is situated. A portside view of the same depicts the pitching motion of each hull. These example bodies of rotation, as simple canonical motions, minimize the need for large mechanical components.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A modeling apparatus comprising:
a model ship configured for use in a wind tunnel, the model ship comprising a hull and a superstructure;
a water surface plane representing a water surface in which the model ship operates; and
a resonance control mechanism comprising a support structure, a pitch actuation mechanism, and a pitch control mechanism, wherein
the support structure is connected to the model ship and provides a pitch axis about a joint traversing the model ship,
the pitch control mechanism tunes the natural frequency of the model ship to a desired value, the pitch control mechanism comprising a tensioning system and a flywheel, and
the pitch actuation mechanism imparts oscillatory pitching motions to the model ship,
wherein the pitch actuation mechanism is configured to maintain a constant waterplane of the hull as the model ship moves in pitch.

2. The modeling apparatus of claim 1,
wherein the tensioning system is a system of springs arranged to provide the model ship with an angular stiffness in pitch,
wherein the flywheel is connected directly to the model ship, the flywheel and the model ship having a shared pitch axis about the joint, and
wherein the system of springs and the ship and flywheel pitch moments of inertia are selected to tune the natural frequency in pitch of the model ship to a desired value.

3. The modeling apparatus of claim 2, wherein the system of springs comprises at least one bow spring and at least one stern spring, wherein the bow spring and stern spring are linear springs connecting the model ship hull to stationary points on the ship model support structure.

4. The modeling apparatus of claim 2, wherein the system of springs comprises a torsional spring mounted to the flywheel.

5. The modeling apparatus of claim 2, the pitch control mechanism comprising:
a counterrotating second flywheel below and in contact with the flywheel, the counterrotating flywheel configured to rotate in a direction opposite to the flywheel,
wherein the counterrotating flywheel acts as a counterrotating dynamic balancing mass to minimize or eliminate total load reacted by the support structure.

6. The modeling apparatus of claim 1, the pitch actuation mechanism comprising:
at least one bow actuator and at least one stern actuator, each configured to bear half of a load on the model ship and sized corresponding to aerodynamic and frictional loads on the model ship.

7. The modeling apparatus of claim 6, the pitch control mechanism comprising:
at least one bow pitch spring and at least one stern pitch spring connected to at least one bow actuator and at least one stern actuator, respectively;
at least one bow actuator line connecting the at least one bow pitch spring and the at least one bow actuator to the bow of the model ship and to a base; and
at least one stern actuator line connecting the at least one stern pitch spring and the at least one stern actuator to the bow of the model ship and to the base,
wherein the at least one bow pitch spring and the at least one stern pitch spring are tuned to increase a rigid body pitch mode of the model ship in order to lower a full-scale frequency of the model ship during operation of the wind tunnel.

8. The modeling apparatus of claim 6, wherein the at least one bow actuator and at least one stern actuator are identical and driven 180° out of phase with each other.

9. The modeling apparatus of claim 1, wherein the water surface plane is a physical plane, such that the support structure resides below the physical plane, the physical plane includes a waterplane cutout within which the model ship resides, such that the physical plane divides the hull of the model ship into a freeboard and a draught, and the gap between the hull and the waterplane cutout remains constant as the model ship pitches, permitting rotation of the model ship about the pitch axis without the hull contacting the edge of the waterplane cutout.

10. The modeling apparatus of claim 9, wherein the physical plane is a base of the wind tunnel.

11. The modeling apparatus of claim 1, wherein at least the superstructure of the model ship is constructed using lightweight construction techniques.

12. The modeling apparatus of claim 11, wherein the lightweight construction techniques include one of a carbon fiber/foam sandwich, a thin-walled additive manufactured article reinforced with bulkheads and stringers, or a combination thereof.

* * * * *